(No Model.)
W. HARRISS.
INSECT SHIELD.
No. 584,506. Patented June 15, 1897.
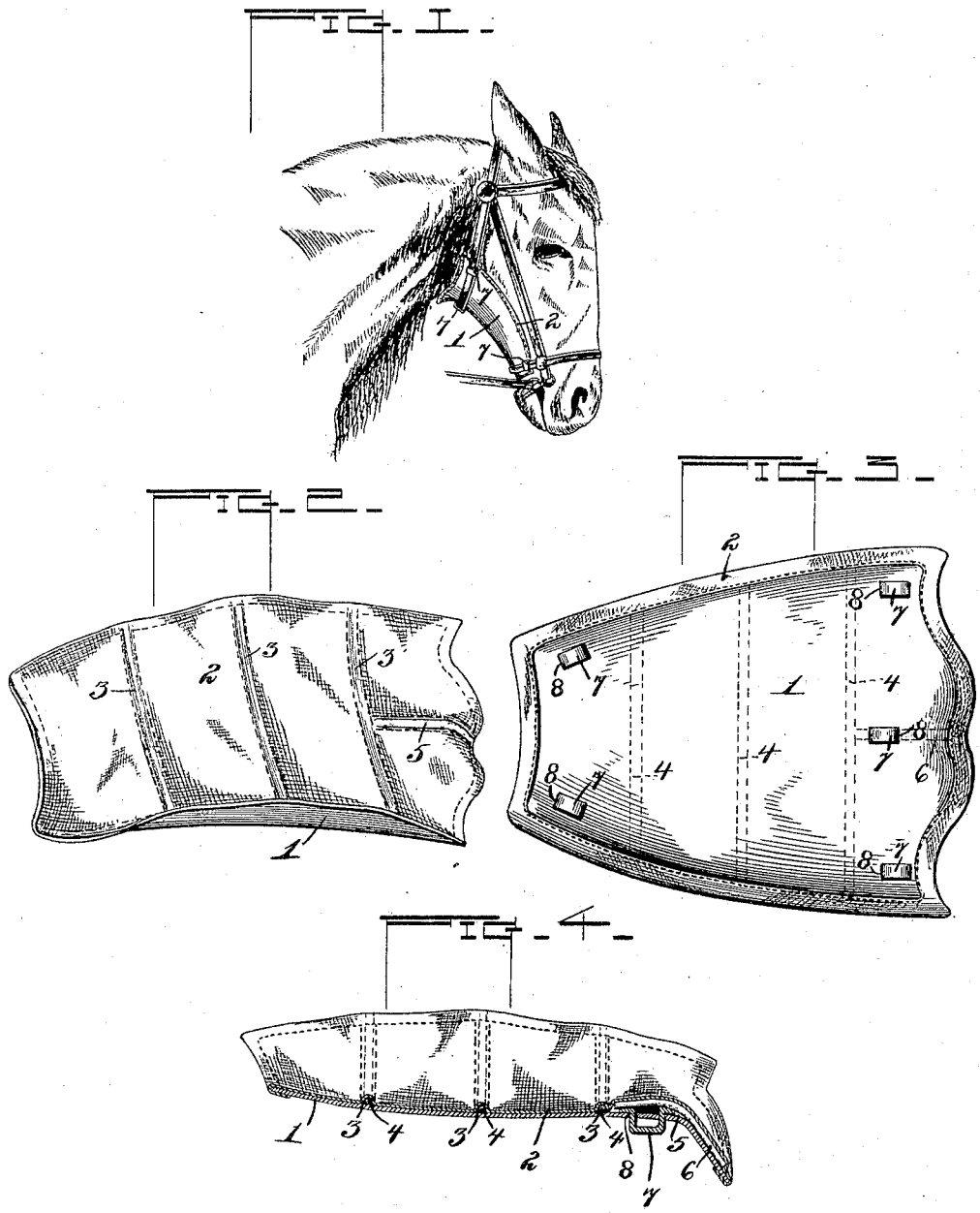
Witnesses
Milton O'Connell
[signature]
Inventor
William Harriss,
By his Attorneys,
C. A. Snow & Co.

UNITED STATES PATENT OFFICE.

WILLIAM HARRISS, OF JOHNSTOWN, OHIO.

INSECT-SHIELD.

SPECIFICATION forming part of Letters Patent No. 584,506, dated June 15, 1897.

Application filed June 13, 1896. Serial No. 595,435. (No model.)

*To all whom it may concern:*

Be it known that I, WILLIAM HARRISS, a citizen of the United States, residing at Johnstown, in the county of Licking and State of Ohio, have invented a new and useful Insect-Shield, of which the following is a specification.

My invention relates to insect-shields, and has for its object to provide improved means for protecting the lower jaws of horses and other animals from annoying insects, said shield being capable of adjustment to snugly fit the jaw of the animal to which it is applied without preventing a free circulation of air therebetween.

Further objects and advantages of this invention will appear in the following description, and the novel features thereof will be particularly pointed out in the appended claims.

In the drawings, Figure 1 is a perspective view of an insect-shield constructed in accordance with my invention, the same being shown applied. Fig. 2 is a detail perspective view of the shield. Fig. 3 is a bottom or exterior plan view thereof. Fig. 4 is a central longitudinal section.

Similar numerals of reference indicate corresponding parts in all the figures of the drawings.

The body 1 of the shield is constructed of flexible material, such as leather, enameled goods, or suitable fabric, and is tapered in construction with its rear or upper end of greater width than the front or lower end to suit the shape of the under jaw of an animal. The body of the shield is preferably provided with a lining 2 on its inner or upper side, and this lining is stitched to form transverse pockets 3, which extend from one lateral edge to the other of the shield to receive strengthening-ribs 4, which impart to the shield the transversely curved or concaved form which is necessary to fit snugly around the under jaw of the animal. In a longitudinal pocket 5, which extends from the center of the rear or upper end of the shield to the center of the uppermost transverse pocket 3, is fitted a longitudinal strengthening-rib 6, which is bent downwardly at its upper extremity to cause the upper portion of the shield to conform to the curve of the throat of the animal. Inasmuch as the extremities of the uppermost transverse rib are bent upwardly while the extremity of the central longitudinal rib is bent downwardly it will be seen that the upper edge of the shield is caused to fit snugly around the throat and adjoining portion of the under jaw of the animal without gagging the latter.

Inasmuch as a uniform shape of shield cannot be adopted for all animals, I have found it desirable to construct the transverse and longitudinal ribs of pliable material, such as wire, which, while being stiff enough to hold the shield in the desired shape when in use, are capable of adjustment to provide for shaping the shield to conform accurately to the under jaw to which it is to be applied. In the same way if the length of the shield is more than required the longitudinal stiffening or strengthening rib 6 may be bent at such a point as to avoid inconvenience by pressure against the throat of the animal.

The means which I have adopted for facilitating the attachment of the shield include exterior loops 7, two of which are arranged near the front or reduced end of the shield, while three are preferably employed at the enlarged or rear end thereof, said loops having their extremities passed through apertures 8, formed in the body of the shield, and being secured in place therein. These loops are designed for engagement, respectively, by the chin-strap and throat-latch of a halter or bridle, or may be provided with the equivalents of these members of a bridle when it is desired to apply the shield independently. No modification of the harness is necessary, however, to provide for the use of the shield embodying my invention, and, if preferred, the shield may be applied and removed with the bridle in the operation of harnessing and unharnessing the animal.

The advantage derived from the use of pliable stiffening or strengthening ribs arranged transversely in the body portion of the shield and longitudinally at the upper or rear end thereof to protect the throat of the animal consists not only in the fact that the shield may be made to conform accurately to the under jaw of the animal, but may be so arranged as to avoid chafing or irritating contact with the animal and at the same time permit a free circulation of air between the under jaw and the surface of the shield to guard against overheating at this point. I do not depend upon the throat-latch and chin-strap to hold the shield in the desired shape for the reason that by the tightening of these straps the contiguous portions of the shield are drawn too snugly in contact with the under jaw of the animal, while the intermediate portion thereof is allowed to sag. Particularly the lateral edges of a shield depending upon the throat-latch and chin-strap of a bridle fall away from the jaw of the animal and allow the entrance of insects, besides detracting materially from the neatness of the appearance of the attachment; but by using the stiffening devices herein described the shape of the shield, which has been adjusted to fit the animal, is maintained without unnecessarily tightening the chin-strap and throat-latch and at the same time the lateral edges of the shield are prevented from dropping out of their proper positions.

The central portion of the rear edge of the shield is extended beyond a transverse line connecting the rear ends of the side edges, and while the loops 7 at the rear end of the shield adjacent to the side edges are located contiguous to the angles the intermediate loop is set forward of a straight line connecting the side loops, thus leaving a considerable space between the intermediate or central loop and the center of the rear edge of the shield. The longitudinal stiffening-rib extends from this central or intermediate loop to the center of the rear edge of the shield and thus adapts the center of the rear edge of the shield to be folded downwardly, as above described, to avoid chafing the throat of the animal and also to shorten the shield to suit the length of the under jaw of the animal, whereby shields constructed in accordance with my invention may be made in assorted sizes, each shield being adapted to fit jaws of different sizes.

Various changes in the form, proportion, and the minor details of construction may be resorted to without departing from the spirit or sacrificing any of the advantages of this invention.

Having described my invention, what I claim is—

1. An insect-shield, adapted to be applied to the under jaw of an animal, provided with transverse pliable stiffening-ribs, a longitudinal stiffening-rib arranged at the center of the rear edge of the shield, whereby the rear edge of the shield may be bent downward to suit the length of the under jaw of an animal and means for attachment to bridle-straps arranged in advance of said longitudinal stiffening-rib, substantially as specified.

2. An insect-shield, adapted to be applied to the under jaw of an animal, provided with transverse and longitudinal pliable stiffening-ribs, a longitudinal stiffening-rib being arranged at the center of the shield near its rear end, whereby the central portion of the rear edge of the shield may be bent downward, and exterior loops at the front and rear ends of the shield for engagement by a chin-strap and a throat-latch of a bridle, the loops at the rear end of the shield being arranged respectively contiguous to the rear angles and at an intermediate point in advance of the center of the rear edge of the shield, whereby said rear edge may be folded downwardly without interfering with the securing devices, substantially as specified.

3. An insect-shield, adapted to be applied to the under jaw of an animal, provided with transverse and longitudinal pliable stiffening-ribs, and having the central portion of its rear edge extended in rear of a transverse line connecting the rear angles, and having a longitudinal stiffening-rib located at the center to provide for the downward bending of said rearward extension, and exterior loops for engagement by halter-straps, those loops at the rear end of the shield being located respectively at the rear angles and at an intermediate point in advance of a transverse line connecting the rear angles, substantially as specified.

In testimony that I claim the foregoing as my own I have hereto affixed my signature in the presence of two witnesses.

WILLIAM HARRISS.

Witnesses:
A. J. CARTER,
ADDAH M. TIPPETT.